Sept. 6, 1966    J. C. WILD    3,270,460
THERMOSTATICALLY CONTROLLED SPRINKLING SYSTEM
Filed Jan. 6, 1964
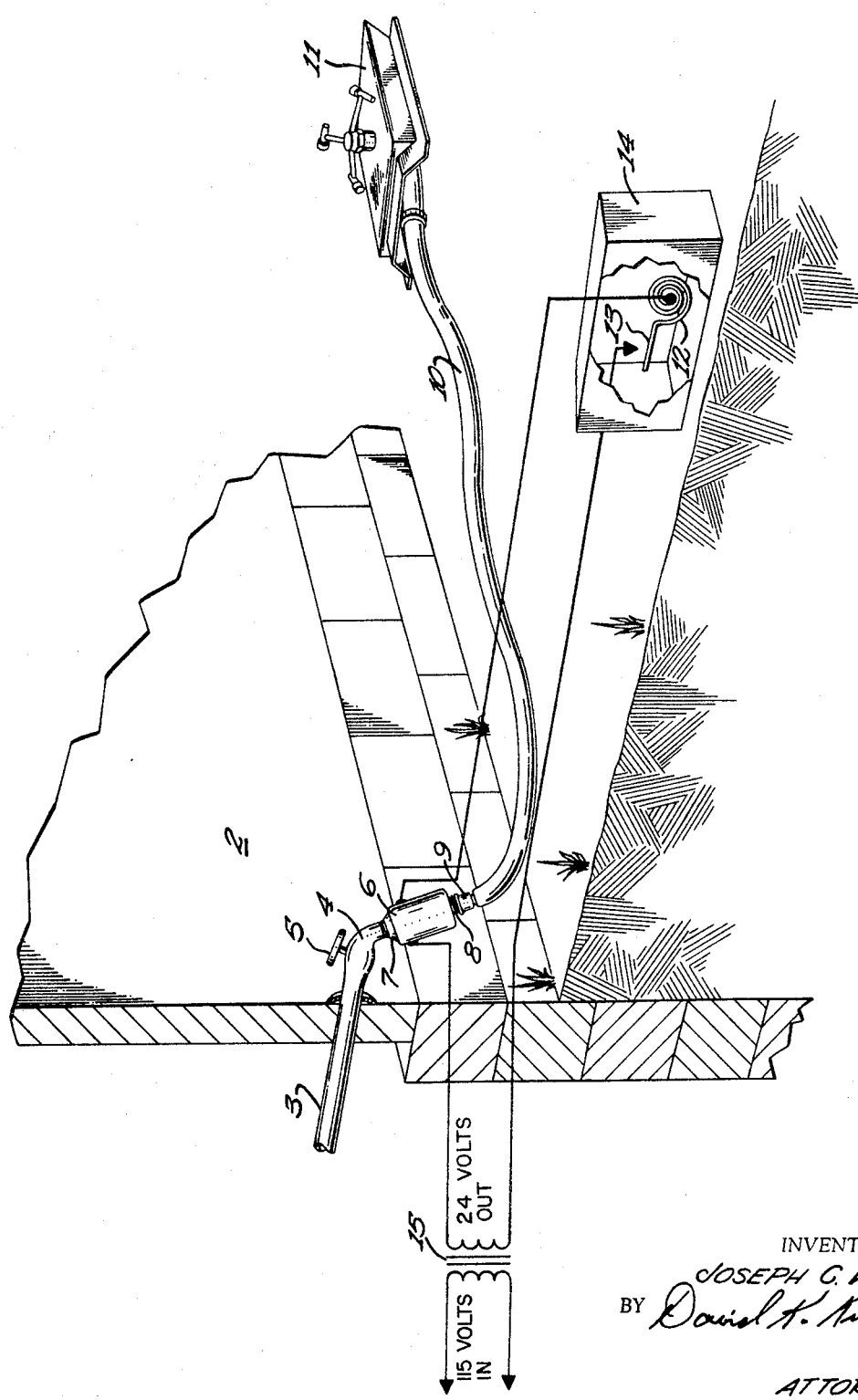
INVENTOR.
JOSEPH C. WILD
BY David H. Kilgore
ATTORNEY 3,270,460
THERMOSTATICALLY CONTROLLED
SPRINKLING SYSTEM
Joseph C. Wild, 7701 Modern Road, Minneapolis, Minn.
Filed Jan. 6, 1964, Ser. No. 335,898
2 Claims. (Cl. 47—2)

This invention relates broadly to sprinkling systems generally intended for watering lawns, gardens and the like, and more particularly to a thermostatically controlled sprinkling system wherein the same is activated and conversely deactivated by a thermostat having switch means, said thermostat being remotely positioned relative to the source of water.

The principal object of this invention is to provide a thermostatically controlled sprinkling system particularly intended for use in lawns and gardens to apply a protective water cover thereon such as during the night when frost is threatened and it is not convenient to activate the sprinkling system manually, said sprinkling system being automatically activated and deactivated by thermostatic means adjusted to operate the system when outside mean temperatures drop to near or below frost level and conversely deactivate the same as said temperature rises.

Another object of the invention is to provide a thermostatically controlled sprinkling system for use in lawns and garden plots wherein a water valve is controlled by thermostaic means located remotely from a water source but adjacent the area to be protected by the water cover.

A further object of the invention is to provide a thermostatically controlled sprinkling system for outdoor use wherein sprinkling means comprising hose and a sprinkler head is connected to a valve at the water source said valve being activated by thermostatic means placed adjacent the area to be protected by a water cover, said thermostatic means being located out of the range of the sprinkling means.

A further object of the invention is to provide a thermostatically controlled sprinkling system wherein the water source is remote from the thermostat and is generally a standard sill cock adapted to receive a thermostatically controlled water valve adapted to receive at its discharge end, the standard fitting of a conventional garden hose.

Another object of this invention is to provide a thermostatically controlled sprinkling system that is simple and positive in operation and relatively inexpensive to manufacture for the reason that is generally assembled from standard parts connected to conventional sources of water and electric power.

These and other objects of the invention will become apparent from the following specification and claims when taken in conjunction with the appended drawing which forms a part of this invention and in which drawing, like characters indicate like parts throughout the several views.

To the above end, generally stated, the invention consists of the following devices and combination of devices, hereinafter described and defined in the claims.

Referring to the drawing:

The drawing is a perspective view showing the elements of the invention connected to conventional sources of water and electric power in a typical installation, including a wiring diagram.

The numeral 2 is directed to a fragmentary showing of a building structure having a water pressure line 3 terminating on the outside of said building structure at a conventional sill cock 4 having hand operated means 5 whereby the discharge of water under pressure is manually controlled.

The numeral 6 indicates an electrically energized solenoid water valve adapted for screw threaded engagement at its inner end portion 7 with the discharge port of the sill cock 4, said solenoid valve at its outer end portion 8 being provided with threads to receive the standard fitting 9 of a conventional garden hose 10, fragmentarily shown. In actual use this garden hose 10 will be of such length as to reach the area to be covered by the sprinkler head 11 connected to the outer end portion of the hose 10.

A bi-metallic thermostat 12 having conventional switch means 13 is mounted within a vented housing 14 which, when the system is in use, is placed adjacent the area to be protected by the water cover but for obvious reasons, out of range of the discharge from the sprinkler head 11.

A preferred means for actuating the solenoid water valve 6 is to interpose a transformer 15 in an electric circuit between conventional 115 volt house current and the said solenoid water valve and the thermostat 12 and its switch means 13 to thus reduce the operating voltage from 115 volts to substantially 24 volts which has been found to be very satisfactory for the intended purpose.

It will be understood of course that the invention is not limited to the source of power aforesaid and that a number of satisfactory switch means are available for cooperation with the bi-metallic thermostat.

It will thus be seen that with the bi-metallic thermostat 12 placed adjacent the area to be protected by a water cover from the sprinkler head 11 the said thermostat will afford means whereby the solenoid water valve 6 is energized by the electric current controlled by the switch means 13, said switch means being activated by the bi-metallic thermostat 12. With the solenoid water valve 6 mounted on the discharge side of the sill cock 4 and with its manually operated valve 5 open, water pressure at the solenoid valve is controlled by the predetermined setting of the thermostat 12 causing the same to energize the said solenoid via the current passing through the switch means 13 held closed by the action of means outside temperature on the bi-metallic thermostat 12 for as long a time as the said temperature remains below its frost level setting, and conversely by the same means open the electric circuit at the switch means 13 when the said temperature rises above the predetermined high setting of said thermostat to interrupt the flow of water under pressure to the sprinkler head 11.

Obviously then, with the electric circuit closed, water under pressure will flow through the open solenoid valve 6, the hose 10 and the sprinkler head 11, and with the circuit open, the flow of water through the solenoid valve 6 will be interrupted, to flow again only when the outside mean temperature drops below the predetermined low setting of the thermostat 12.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. The method of preventing frost damage to garden plots by applying a continuous water cover thereto while mean outside temperatures are at or below frost level, said method comprising at least one sprinkler head in said garden plot, said sprinkler head being connected to a source of water pressure, said water being controlled by a valve energized by a thermostat, said thermostat being adjacent but beyond the range of the sprinkler head and its water discharge, electric switch mean cooperating with the thermostat to close and open the valve according to predetermined adjustments of the thermostat actuated by the mean outside temperature at the location of the same in the garden plot, and an electric circuit originating at a conventional source of electric current whereby the switch means cooperating with the thermostat is energized to close or open the electric circuit as the temperature fluctuates between the high and low settings of the thermostat and its switch means.

2. The method of claim 1 of preventing frost damage to garden plots including a solenoid operated water valve controlling flow of water and a bi-metallic thermostat actuating the solenoid operated valve.

References Cited by the Examiner

UNITED STATES PATENTS

| | | | |
|---|---|---|---|
| 496,376 | 4/1893 | Babbitt | 47—2 |
| 661,898 | 11/1900 | Tucker | 47—2 |
| 1,848,398 | 3/1932 | Towt | 47—2 |
| 2,004,194 | 6/1935 | Lucy-Mulhall | 239—1 |
| 2,506,936 | 5/1950 | Murray | 62—64 |
| 2,524,796 | 10/1950 | Higgins | 239—67 |
| 2,928,606 | 3/1960 | Lee | 239—67 |
| 2,989,667 | 6/1961 | Swink | 239—63 |

EVERETT W. KIRBY, *Primary Examiner.*